United States Patent
Lin et al.

(10) Patent No.: US 7,698,474 B2
(45) Date of Patent: Apr. 13, 2010

(54) VIRTUAL FIRST IN FIRST OUT (FIFO) DIRECT MEMORY ACCESS (DMA) DEVICE, ELECTRONIC DEVICE AND MEMORY ACCESS METHOD USING THE SAME

(75) Inventors: Yen-Yu Lin, Taipei (TW); Shih-Chang Hu, Chupei (TW); Shiau-Wan Chen, Shueilin Township, Yunlin County (TW)

(73) Assignee: Mediatek Inc., Hsin-Chu (TW)

( * ) Notice: Subject to any disclaimer, the term of this patent is extended or adjusted under 35 U.S.C. 154(b) by 122 days.

(21) Appl. No.: 11/495,888

(22) Filed: Jul. 31, 2006

(65) Prior Publication Data

US 2007/0033302 A1 Feb. 8, 2007

Related U.S. Application Data

(63) Continuation-in-part of application No. 11/002,391, filed on Dec. 3, 2004, now abandoned.

(30) Foreign Application Priority Data

Dec. 5, 2003 (TW) .................................. 92134466
Dec. 2, 2004 (TW) .................................. 93137250

(51) Int. Cl.
*G06F 13/28* (2006.01)
*G06F 5/00* (2006.01)
(52) U.S. Cl. .......................................... 710/22; 710/52

(58) Field of Classification Search ................... 710/22, 710/52
See application file for complete search history.

(56) References Cited

U.S. PATENT DOCUMENTS

| 4,942,553 | A | * | 7/1990 | Dalrymple et al. ............ 710/57 |
| 5,301,287 | A | * | 4/1994 | Herrell et al. ................ 711/202 |
| 5,444,853 | A | * | 8/1995 | Lentz .......................... 711/123 |
| 5,608,889 | A | * | 3/1997 | Werlinger et al. ............. 711/217 |
| 6,212,593 | B1 | * | 4/2001 | Pham et al. ................... 710/266 |
| 6,230,255 | B1 | * | 5/2001 | Asghar et al. ................. 712/32 |
| 2004/0030816 | A1 | * | 2/2004 | Knight et al. ................. 710/52 |

* cited by examiner

*Primary Examiner*—Henry W. H. Tsai
*Assistant Examiner*—Hyun Nam
(74) *Attorney, Agent, or Firm*—Rabin & Berdo, P.C.

(57) ABSTRACT

A virtual first in first out (FIFO) direct memory access (DMA) device applied in an electronic device having a processor, a UART unit and a virtual FIFO unit is provided. In the virtual FIFO DMA device, a DMA unit is for transferring data between the UART unit and the virtual FIFO unit. A virtual FIFO controller, which has a read pointer and a write pointer, is electrically connected with the DMA unit. When the DMA unit reads data from or writes data into the virtual FIFO unit, the virtual FIFO controller correspondingly changes the value of the read pointer or the write pointer. A virtual port is electrically connected to the DMA unit and the processor. A processor reads data from or writes data into the virtual FIFO unit via the virtual port and the DMA unit.

26 Claims, 8 Drawing Sheets

VIRTUAL FIRST IN FIRST OUT (FIFO) DIRECT MEMORY ACCESS (DMA) DEVICE, ELECTRONIC DEVICE AND MEMORY ACCESS METHOD USING THE SAME

This application is a continuation-in part of applicants' U.S. application Ser. No. 11/002,391, filed Dec. 3, 2004, now abandoned the subject matter of which is incorporated herein by reference and claims the foreign priority benefit of Taiwan application Serial Nos. 92134466, filed Dec. 5, 2003, and 93137250, filed Dec. 2, 2004 the subject matters of which are incorporated herein by reference.

BACKGROUND OF THE INVENTION

1. Field of the Invention

The invention relates to a direct memory access (DMA) device, and more particularly to a virtual first in first out (FIFO) DMA device.

2. Description of the Related Art

Referring to FIG. 1, a block diagram of a conventional electronic device during UART transmission. To transmit a first data through a UART unit 110, the higher layer software task 102 firstly calls a UART driver and makes the UART driver fill the first data into a buffer 104, which can be a ring buffer or a double buffer. When the first data has been completely filled into the buffer 104, the UART driver updates a buffer pointer set by the UART driver to a next address. Through the DMA unit 106, the first data stored in the buffer 104 is transferred to and stored in the UART first in first out (FIFO) unit, wherein the UART unit 110 serially outputs the first data. Here, the data transfer between the buffer 104 and the UART FIFO unit 108 can be performed by either the DMA unit 106 or a processor. Normally, the DMA unit 106 is more efficient in transferring data.

In a complicated electronic device, however, it is possible that multiple higher software layer tasks 102A and interrupt service routines (ISR) 112 might use the same UART unit 110 to transmit data, as shown in FIG. 2. Under such circumstance, the data stored in the buffer 104 might be overwritten, resulting in data error. If the ISR 112 has a second data that needs to be transmitted by the UART unit 110 when the first data of the higher layer software task 102A is being filled into the buffer 104, the ISR 112 calls the UART driver to store the second data into the buffer 104. Not until the first data of the higher layer software task 102A has been completely filled into the buffer 104 does the UART driver start to update the buffer pointer. Consequently, the second data is written into the buffer 104 according to original buffer pointer, and therefore the first data, which has been written in the buffer 104, is overwritten. After the UART driver has written the second data of the ISR 112 into the buffer 104, the higher layer software task 102A continues to write the first data into the buffer 104 and therefore will overwrite part of the second data. Accordingly, data loss between the first data and the second data, written in the buffer 104, will result in data error.

There are two conventional methods of solving the data error in the buffer 104. The first method is disabling the ISR 112 to prevent the occurrence of data error before the higher layer software task 102A starts to call the UART driver. However, since the ISR 112 might need to be executed in real-time, if the system fails to process the ISR 112 promptly, it will cause a system error.

The second method involves the use of two buffers. Referring to FIG. 3, a block diagram of using two buffers for UART transmission is shown. The second data of the ISR 112 is written in the buffer 104A, while the first data of the higher layer software task 102A is written in the buffer 104B. By controlling the multiplexer 114, the first data and the second data are alternately transferred to the UART FIFO unit 108 and are further transmitted out by the UART unit 110. However, this method requires more memory space for the buffer and the control of the UART driver is more complicated.

Apart from data loss and data error that might occur during UART transmission, the conventional electronic device also has several problems during UART reception. Referring to FIG. 4, a block diagram of a conventional electronic device during UART reception. After a UART unit 410 receives a third data, the third data is temporarily stored in a UART FIFO unit 408, and then a DMA unit 406 will transfer the third data to a buffer 404. After the DMA unit 406 has transmitted the data of a pre-set length to the buffer 404, the DMA unit 406 notifies a processor 416 to read the data stored in the buffer 404. For example, whenever the DMA unit 406 transmits data of 500 bytes to the buffer 404, the DMA unit 406 notifies the processor 416 to read the data stored in the buffer 404.

However, since the length of the third data received by the UART unit 410 is unpredictable, the DMA unit 406 is unable to determine whether the third data has been completely received. For example, assume the length of the third data is 700 bytes. After the DMA unit 406 transmits the first 500 bytes of the third data, the DMA unit 406 notifies the processor 416 to read the data stored in the buffer 404. However, after the DMA unit 406 transmits the other 200 bytes of the third data, the DMA unit 406 will not notify the processor 416 to read the data stored in the buffer 404 because the length of received data (200 bytes of the third data) does not reach the pre-set length and the DMA unit 406 can not determine that the third data has been completely received. Therefore, the processor 416 has to periodically detect the status of the UART FIFO unit 408 so as to determine whether the UART FIFO unit 408 is empty (because the data has been moved to buffer 404). Besides, the processor 416 further determines whether the UART FIFO unit 408 has been in the empty status for a predetermined period. If so, it represents that the data has been received completely. At this time, the processor 406 reads the data stored in the buffer 404 to process the data.

Before the processor 416 detects the status of the UART FIFO unit 408, the processor 416 has to disable the DAM unit 406 first to prevent incorrect detection due to the movement of data by the DAM unit 406. Before disabling the DAM unit 406, the UART unit 410 has to be disabled first and sends a signal to notify the transmitting end to cease the transmission of data.

However, if data happens to be transmitted to the UART unit 410 when the DMA unit 406 is being disabled, the DMA unit 406 is unable to transfer data from the UART FIFO unit 408 to the buffer 404. Under this circumstance, the data stored in the UART FIFO unit 408 might overflow, causing data loss. To prevent data loss, a buffer of at least 16 bytes must be reserved for the UART FIFO unit 418.

On the other hand, if the processor 416 is used to transfer data from the UART FIFO unit 408 to the buffer 404, the UART FIFO unit 408 must be enlarged lest the processor 416 might be frequently interrupted in order to process data transferring because the UART FIFO unit 408 is easily filled up. However, this will further increase the cost.

To summarize, during UART transmission, the UART driver of a conventional electronic device might be unable to update the buffer pointer promptly, resulting in data error as parts of data are overwritten. During UART transmission, (1) the processor 416 must periodically detect the status of the buffer 404 and the UART FIFO unit 408, hence reducing the efficiency of the processor 416; (2) when the DMA unit 406 is disabled, an extra buffer of 16 bytes must be reserved for the UART FIFO unit 408 to prevent the UART FIFO unit 408 from data overflow. It will consequently increase the cost and the chip size of the UART FIFO unit 408.

SUMMARY OF THE INVENTION

It is therefore an object of the invention to provide a virtual FIFO DMA device, which promptly updates pointer value so as to prevent data error caused by data overwriting during UART transmission. According to the invention, the UART FIFO unit does not need to reserve a space of 16 bytes during UART reception, which reduces the cost and the chip size of the UART FIFO unit.

According to another object of the invention, a direct memory access (DMA) applied in an electronic device is provided. The electronic device has a memory access device, a processor, a receiving/transmitting unit, and a data storage unit. The memory access device includes an access unit and a controller. The access unit is connected between the receiving/transmitting unit and the data storage unit for transferring data between the receiving/transmitting unit and the data storage unit. The controller is connected to the access unit for controlling the access unit to read data from or write data into the data storage unit. The processor is connected to the memory access device for reading data from or writing data into the data storage unit through the access unit.

According to still another object of the invention, an electronic device including a memory access device, a receiving/transmitting unit, a data storage unit and a processor is provided. The receiving/transmitting unit is connected to the memory access device. The data storage unit is connected to the memory access device. The memory access device is for transferring data between the device receiving/transmitting unit and the data storage unit. The processor is connected to the memory access device for reading data from or writing data into the data storage unit through the memory access device.

According to a further object of the invention, a virtual first in first out (FIFO) direct memory access (DMA) device applied in an electronic device having a processor, a UART unit and a virtual FIFO unit is provided. The virtual FIFO DMA device includes a DMA unit, a virtual FIFO controller and a virtual port. The DMA unit, which is electrically connected to the UART unit and the virtual FIFO unit, transfers data between the UART unit and the virtual FIFO unit. The virtual FIFO controller, which is electrically connected with the DMA unit, has a read pointer and a write pointer. When DMA unit reads data from or writes data into the virtual FIFO unit, the virtual FIFO controller correspondingly changes the value of read pointer or write pointer. The virtual port is electrically connected to the DMA unit and the processor. The processor reads data from or writes data into the virtual FIFO unit through the virtual port and the DMA unit.

According to further another object of the invention, an electronic device is provided. The electronic device includes a virtual FIFO DMA device, a UART unit, a virtual FIFO unit and a processor. The virtual FIFO DMA device has a DMA unit, a virtual port and a virtual FIFO controller, wherein the virtual port is electrically connected with the DMA unit, while the virtual FIFO controller, which has a read pointer and a write pointer, is electrically connected with the DMA unit. The UART unit is electrically connected with the DMA unit, while the virtual FIFO unit is electrically connected with DMA unit. The DMA unit transfers data between the UART unit and the virtual FIFO unit. When DMA unit reads data from or writes data into the virtual FIFO unit, the virtual FIFO controller correspondingly changes the value of the read pointer or the write pointer. The processor, which is electronically connected with the virtual port, reads data from or writes data into the virtual FIFO unit through the virtual port and the DMA unit.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 8:
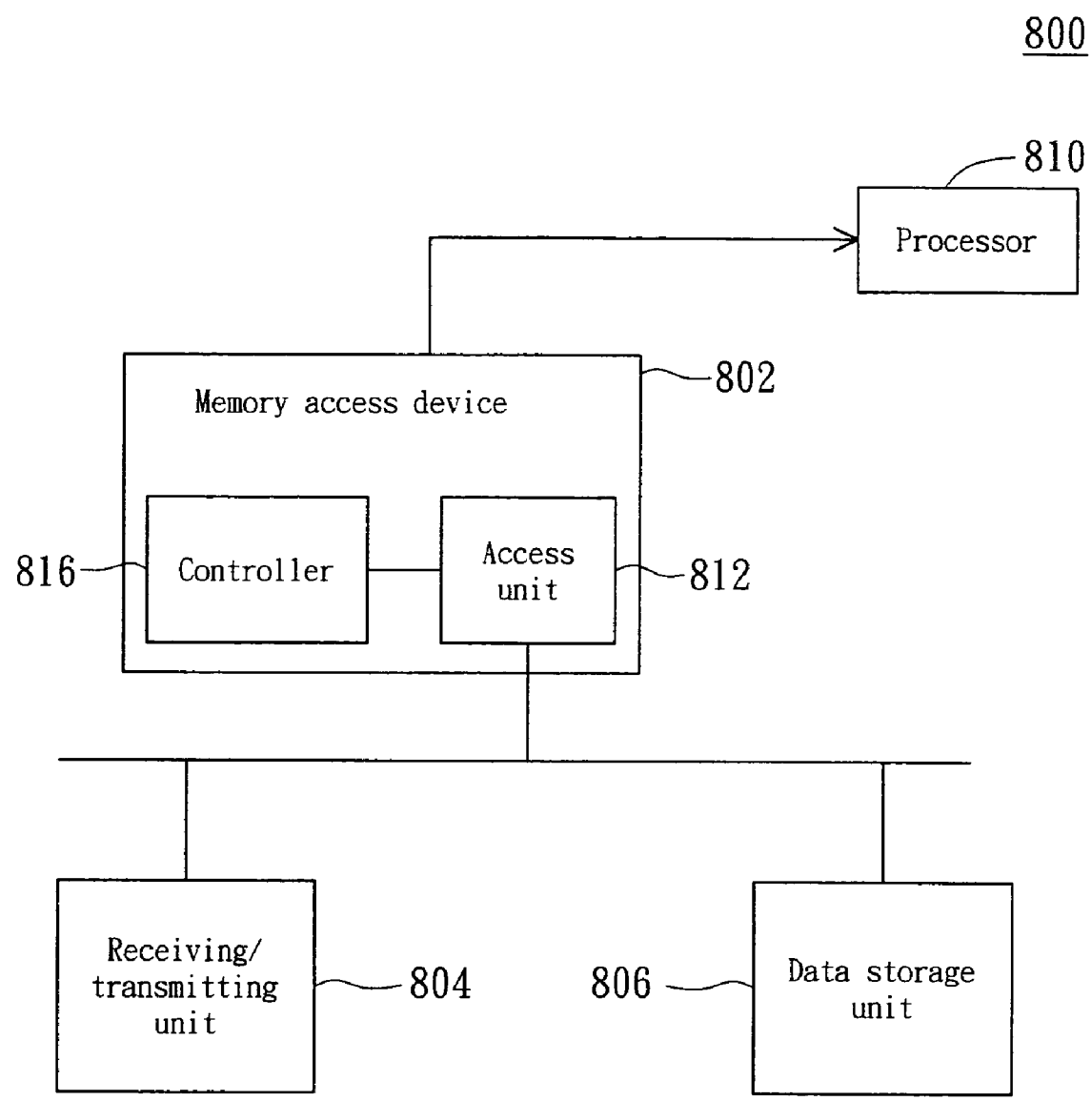
FIG. 8 is a block diagram of an electronic device according to a preferred embodiment of the invention.

Referring to FIG. 8, the invention provides an electronic device 800 including a memory access device 802, a receiving/transmitting unit 804, a data storage unit 806 and a processor 810. The receiving/transmitting unit 804 is connected to the memory access device 802. The data storage unit 806 is connected to the memory access device 802. The memory access device 802 is for transferring data between the receiving/transmitting unit 804 and the data storage unit 806. The processor 810 is connected to the memory access device 802. The processor 810 reads data from or writes data into the data storage unit 806 through the memory access device 802.

The memory access device 802 preferably includes an access unit 812 and a controller 816. The access unit 812 is connected between the receiving/transmitting unit 804 and the data storage unit 806 for transferring data between the receiving/transmitting unit 804 and the data storage unit 806. The controller 816 is connected to the access unit 812 for controlling the access unit 812 to read data from or write data into the data storage unit 806. The processor 810 is for reading data from or saving data into the data storage unit 806 through the access unit 812.

Preferably, the memory access device 802 is a virtual first in first out (FIFO) direct memory access (DMA) device, the receiving/transmitting unit 804 is a universal asynchronous receiver/transmitter (UART) unit, the data storage unit 806 is a virtual FIFO unit, the access unit 812 is a direct memory access (DMA) unit, and the controller 816 is a virtual FIFO controller. The virtual FIFO DMA device preferably includes a virtual port. The invention is exemplified by a preferred embodiment disclosed below.

Different from the conventional technique, the embodiment applies a certain area of the memory as a virtual FIFO unit rather than applying a UART FIFO unit. Therefore, an additional UART FIFO unit is not required in the UART unit of the embodiment of the present invention. Consequently, the cost and chip size of the UART unit can be reduced. In the embodiment of the present invention, the processor of the electronic device can access the virtual FIFO unit through the virtual FIFO DMA device with no data error caused by data overwriting.

Figure 1:
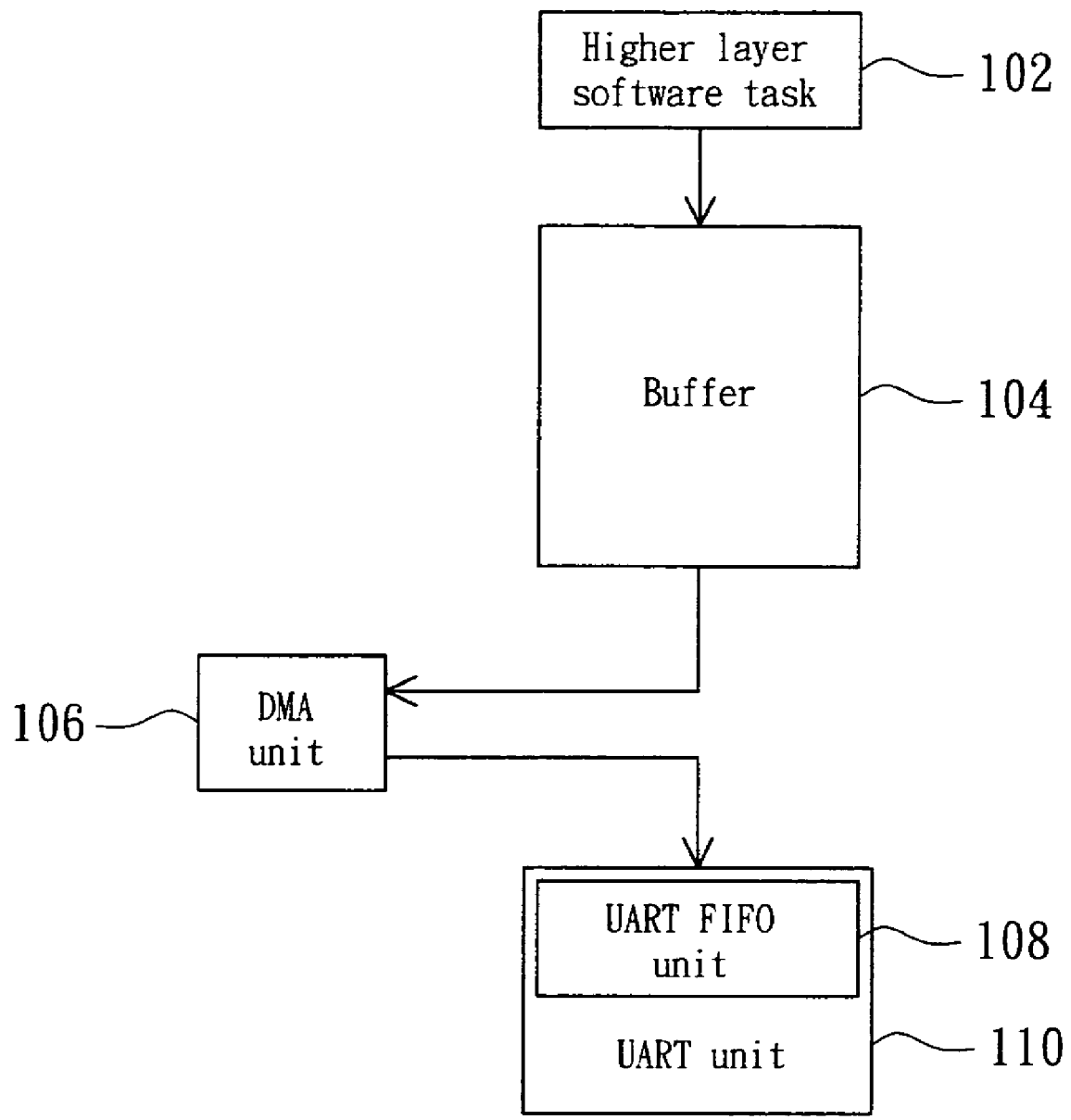
FIG. 1 is a block diagram of a conventional electronic device during UART transmission.
Figure 2:
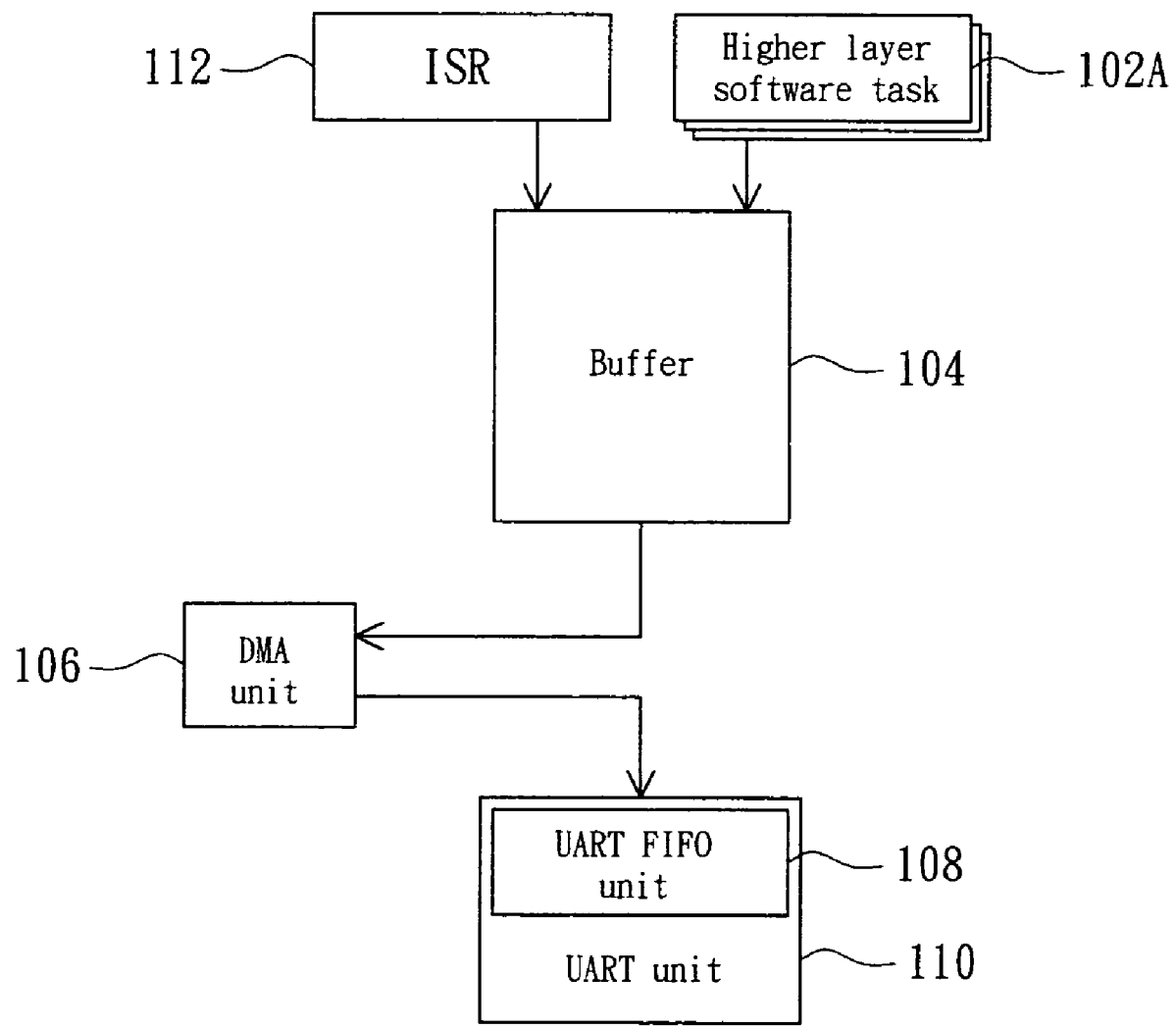
FIG. 2 is a diagram showing the status when plural higher layer software tasks and interrupt service routines use the same UART unit to transmit data.
Figure 3:
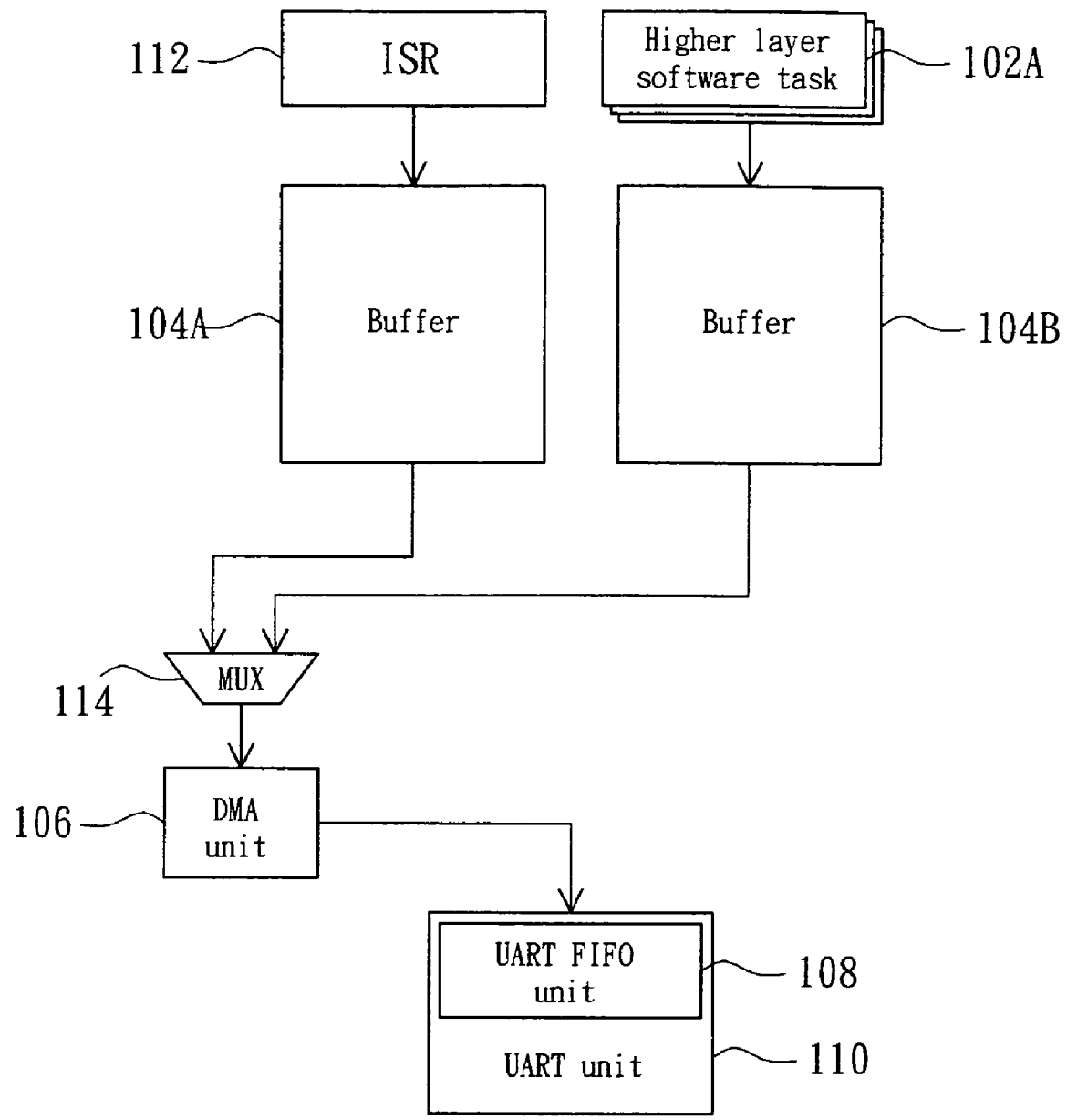
FIG. 3 is a block diagram showing use of two virtual FIFO units for UART transmission.
Figure 4:
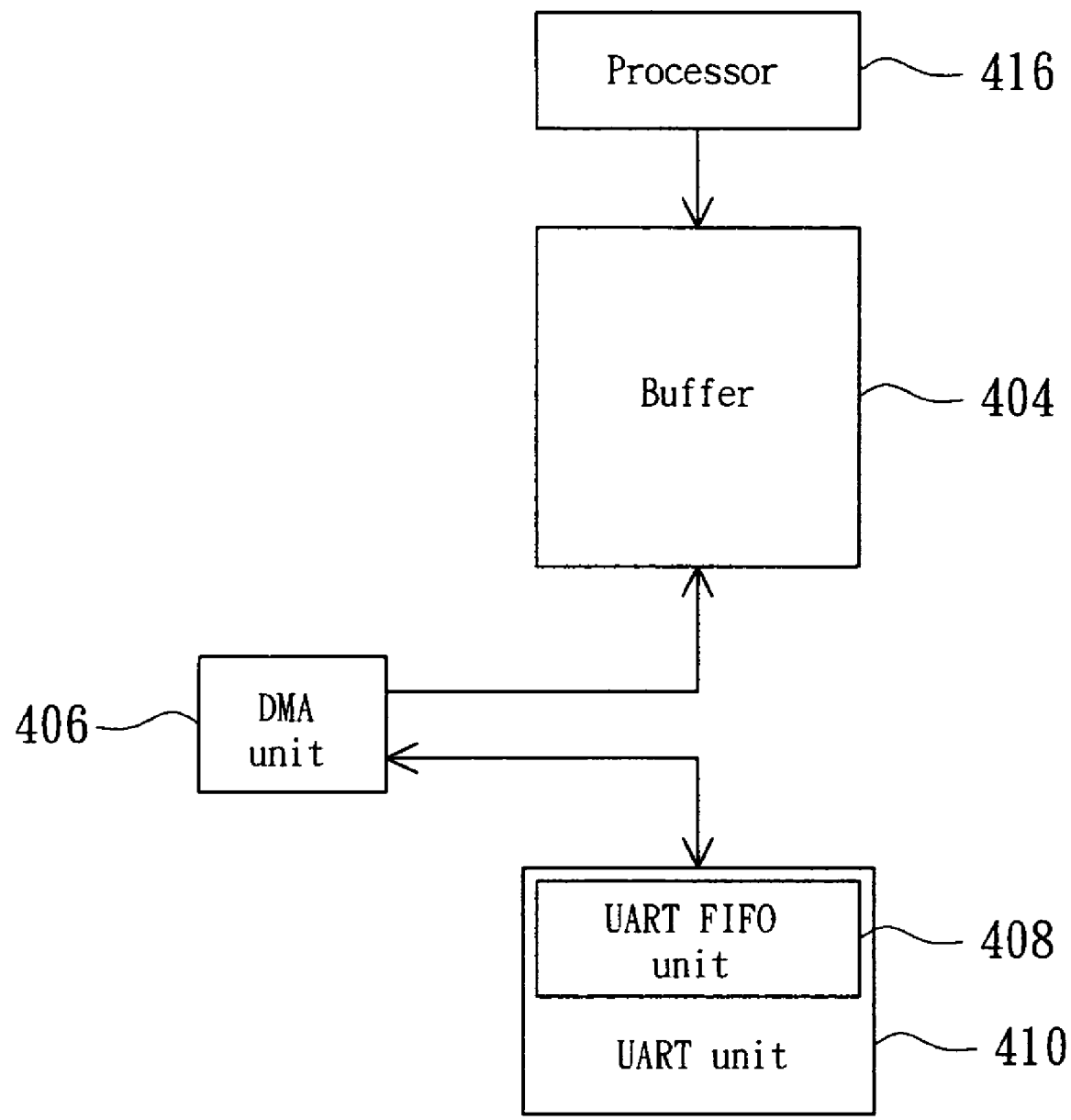
FIG. 4 is a block diagram of a conventional electronic device during UART reception.
Figure 5:
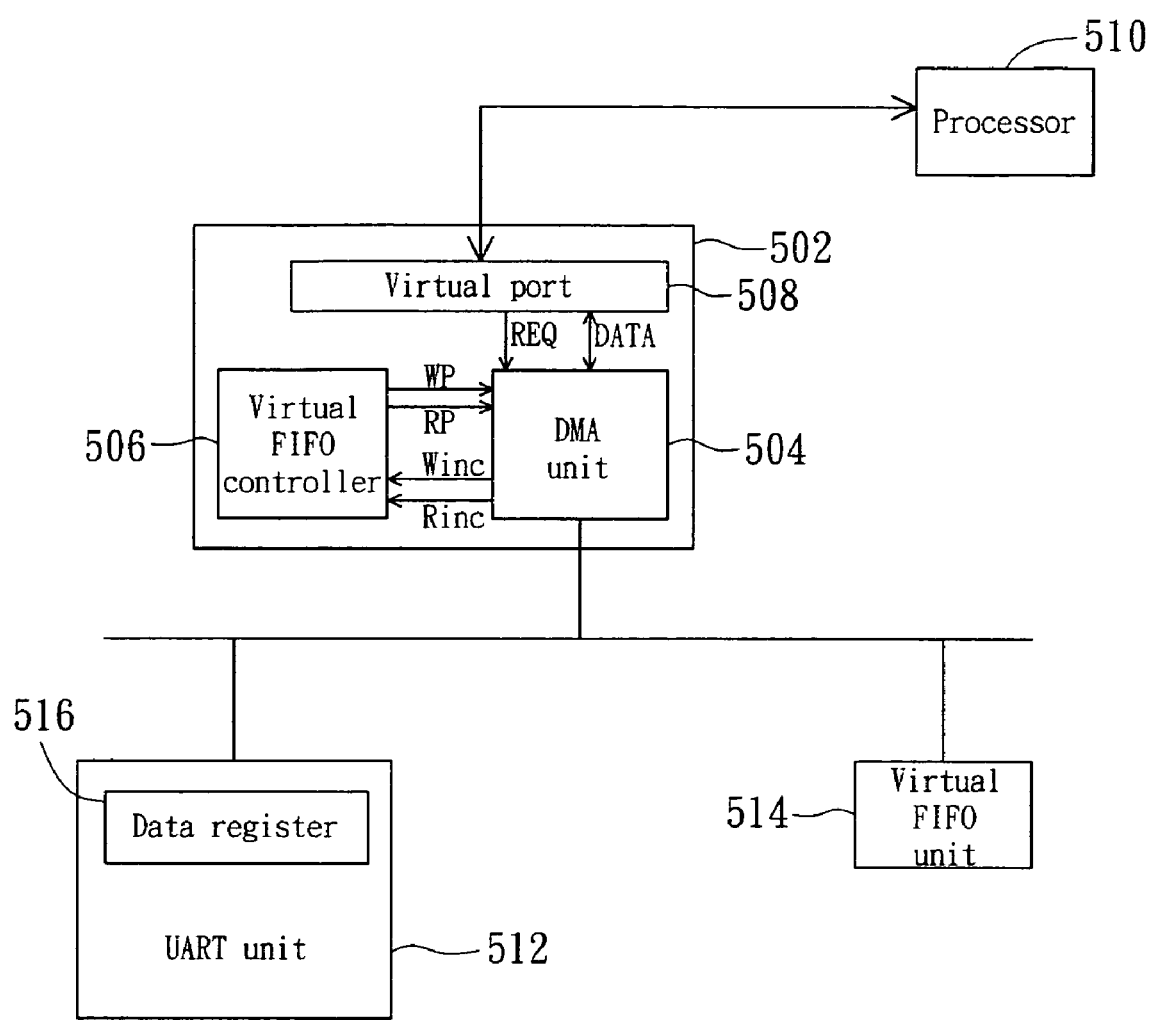
FIG. 5 is a block diagram of a virtual FIFO DMA device according to a preferred embodiment of the invention.

Referring to FIG. 5 a block diagram of a virtual FIFO DMA device according to a preferred embodiment of the invention is shown. The virtual FIFO DMA device 502 according to the embodiment of the present invention is applied in an electronic device 500. For example, the electronic device 500 is a mobile phone. The electronic device 500 includes a processor 510, a UART unit 512 and a virtual FIFO unit 514. The virtual FIFO DMA device 502 includes a DMA unit 504, a virtual FIFO controller 506 and a virtual port 508. The DMA unit 504, which is respectively electrically connected with the UART unit 512 and the virtual FIFO unit 514, is for transferring data between the UART unit 512 and the virtual FIFO unit 514. The virtual FIFO controller 506, which is electrically connected with the DMA unit 504, has a read pointer RP and a write pointer WP, for respectively pointing to a data reading location and a data writing location. When the DMA unit 504 reads data from or writes data into the virtual FIFO unit 514, the virtual FIFO controller 506 correspondingly changes the value of the read pointer RP or the write pointer WP. The virtual port 508 is respectively electrically connected with the DMA unit 504 and the processor 510, as an access interface thereof. The processor 510 reads data from or writes data into the virtual FIFO unit 514 through the virtual port 508 and the DMA unit 504.

Figure 6:
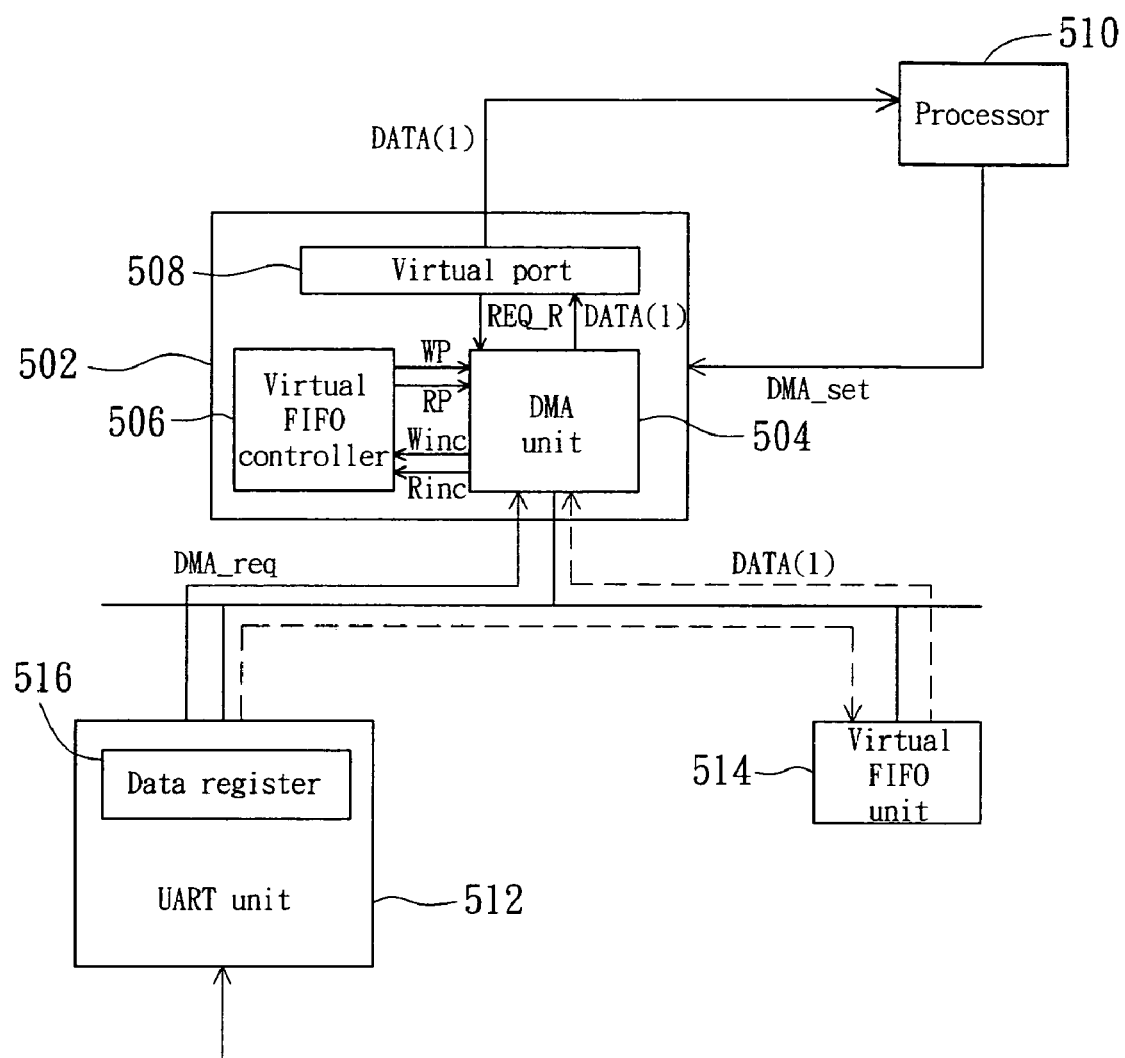
FIG. 6 is a system block diagram of an electronic device using the virtual FIFO DMA device of the invention when the UART unit performs data reception.

Referring to FIG. 6, a system block diagram of an electronic device 500 using the virtual FIFO DMA device 502 of the embodiment of the present invention when the UART unit 512 performs data reception is shown. In the electronic device 500, the UART unit 512 is electrically connected with the DMA unit 504; the virtual FIFO unit 514 is electrically connected with the DMA unit 504; and the processor 510 is electrically connected with the virtual port 508. The UART unit 516 has a data register 516 whose memory is one byte for instance. After the electronic device 500 is started and before the UART unit 512 is enabled, the processor 510 sets a certain area of a memory as a virtual FIFO unit and enables the FIFO DMA device 502. The processor 510 further sends a DMA setting signal DMA_set to set the initial value of the write pointer WP and the read pointer RP to the initial location of the area.

After that, the processor 510 enable UART unit 512. When the UART unit 512 receives data up to one byte, the UART unit 512 sends a request signal DMA_req to request the DMA unit 504 to transfer (write) the data from the data register 516 to the location where the write pointer WP points in the virtual FIFO unit 514. Meanwhile, the DMA unit 504 sends a write notice signal Winc to the virtual FIFO controller 506 so that the virtual FIFO controller 506 correspondingly changes the value of the write pointer WP.

Besides, the processor 510 can read data stored in the virtual FIFO unit 514 through the virtual port 508 and the DMA unit 504 at any time. The virtual port 508 has a peripheral device address and the processor 510 takes the virtual FIFO DMA device 502 as a peripheral device. When the processor 510 is going to read the data in the virtual FIFO unit 514, the processor 510 sends a reading signal to the virtual port 508, so that the virtual port 508 sends a DMA read request REQ_R to the DMA unit 504. At this time, the DMA unit 504 reads the virtual FIFO unit 514 to read a first data DATA(1) according to the read pointer RP. The DMA unit 504 further sends a read notice signal Rinc to the virtual FIFO controller 506, so that the virtual FIFO controller 506 changes the value of the read pointer RP accordingly. After that, the DMA unit 504 transmits the first data DATA(1) to the virtual port 508, which in turn transmits the first data DATA(1) to the processor 510.

The virtual FIFO controller 506 further has a flow control function. The virtual FIFO controller 506 disables all write instructions and instructs the UART unit 512 to notify the transmitting end to cease the transmission of data when the virtual FIFO unit 514 is substantially full and disables all read instructions when the virtual FIFO virtual FIFO unit 514 is substantially empty. The virtual FIFO unit 514 can additionally reserve a buffer of 16 bytes to accomplish the request where the DMA unit 504 still needs to transfer data from the UART unit 512 to the virtual FIFO unit 514 when the virtual FIFO unit 514 is almost full but the transmitting end has not yet ceased the transmission of data.

In the embodiment, the processor 510 accesses the virtual FIFO unit 514 through the UART unit 512. The UART unit 512 writes data to the virtual FIFO unit 514 whenever the UART unit 512 receives one byte data. Therefore, despite that the UART unit 512 is unable to predict the length of the data received and that the DMA unit 504 is unable to determine whether the data having a plurality of bytes has been completely received, the processor 510 can still access the virtual FIFO unit 514 through the UART unit 512 without disabling the DMA unit 504. Furthermore, by setting a certain area of the memory as the virtual FIFO unit in the embodiment, the UART unit 512 does not require the UART FIFO unit of 16 bytes and the chip size of the UART unit 512 is thus reduced.

Figure 7:
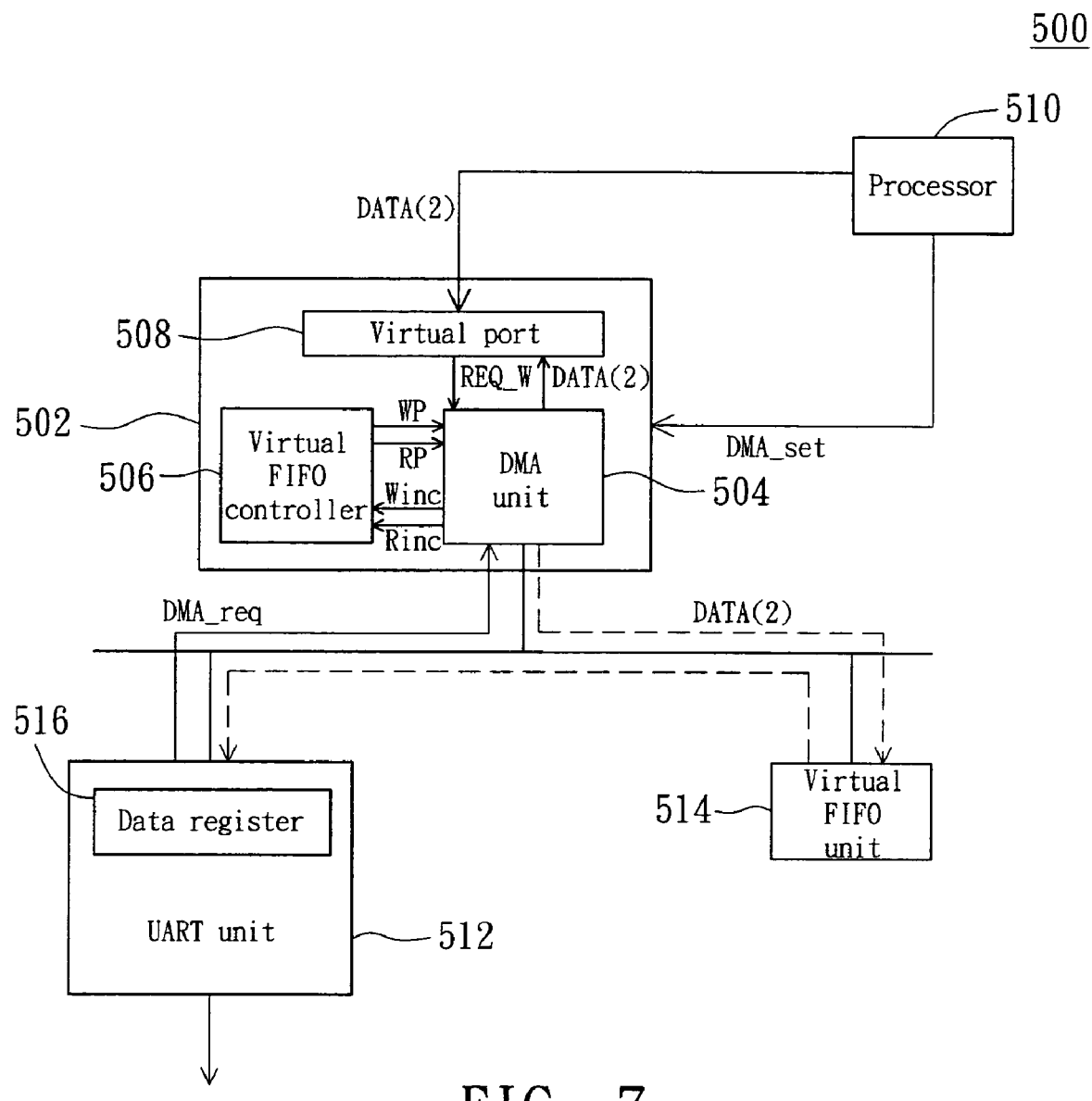
FIG. 7 is a system block diagram of an electronic device using the virtual FIFO DMA device of the invention when the UART unit is performing data transmission.

Referring to FIG. 7, a system block diagram of an electronic device 500 when the UART unit 512 performs data transmission is shown. In the electronic device 500, when data of the processor 510 need to be transmitted by the UART unit 512, the processor 510 transmits a transmission instruction and a data-to-be-transmitted data DATA(2) to the virtual port 508. The virtual port 508 sends a write request REQ_W to the DMA unit 504, so that the DMA unit 504 writes the DATA(2) to the virtual FIFO unit 514 according to the value of the write pointer WP. Meanwhile, the DMA unit 504 sends the write notice signal Winc to the virtual FIFO controller 506 for the virtual FIFO controller 506 to correspondingly change the value of the write pointer WP. After that, the DMA unit 504 sequentially transfers the data from the virtual FIFO unit 514 to the data register 516 of the UART unit 512.

Writing data into the virtual FIFO unit 514 by the processor 510, including the writing of data performed under the instruction of the higher layer software task and the ISR, is completed by the virtual FIFO DMA device 502. No matter the writing of data is instructed by the higher layer software task or by the ISR, the processor 510 writes data into the virtual FIFO unit 514 through the virtual port 508 and the DMA unit 504; meanwhile, the DMA unit 504 sends a writing notice signal Winc to instruct the virtual FIFO controller 506 to update the value of the write pointer WP. According to the conventional method, the UART driver cannot update the buffer pointer until the higher layer software task or the ISR has completed writing the data. Compared with the conventional method, the virtual FIFO controller 506 according to the embodiment can promptly update the value of the write pointer WP while writing data with no data error caused by data overwriting.

Through the virtual FIFO DMA device according to the embodiment, the UART driver controls the virtual FIFO unit as one FIFO unit. The complexity of the UART driver is therefore reduced. Moreover, compared with the conventional method, the embodiment sets a certain area of memory as the virtual FIFO unit and utilizes the virtual FIFO DMA device to access the virtual FIFO. Therefore, extra UART FIFO unit is not required, and the chip size of the UART unit can be further reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A direct memory access (DMA) device applied in an electronic device, the electronic device having a processor, a receiving/transmitting unit, and a data storage unit, the direct memory access device comprising:
    an access unit connected between the receiving/transmitting unit and the data storage unit, the access unit controlling transferring of data between the receiving/transmitting unit and the data storage unit; and
    a controller connected to the access unit, the controller controlling the access unit to read data from or write data into the data storage unit;
    wherein the processor is connected to the direct memory access device, the processor reading data from or writing data into the data storage unit through the access unit; and
    wherein when the receiving/transmitting unit receives data up to a particular amount during data writing, the receiving/transmitting unit requests the access unit to transfer data from the receiving/transmitting unit to the data storage unit where a write pointer of the controller points, and the access unit further sends a notice signal to the controller so that the controller correspondingly changes the value of the write pointer.

2. The device according to claim 1,
    wherein the direct memory access device is a virtual first in first out (FIFO) direct memory access (DMA) device, the receiving/transmitting unit is a universal asynchronous receiver/transmitter (UART) unit, the data storage unit is a virtual FIFO unit, the access unit is a direct memory access (DMA) unit, the controller is a virtual FIFO controller, the virtual FIFO DMA device further comprising:
    a virtual port electrically connected to the DMA unit and the processor, wherein the processor reads data from or writes data into the virtual FIFO unit through the virtual port and the DMA unit.

3. The device according to claim 2, wherein the virtual FIFO controller has a read pointer and the write pointer, and when the DMA unit reads data from or writes data into the virtual FIFO unit, the virtual FIFO controller correspondingly changes a value of the read pointer or a value of the write pointer.

4. The device according to claim 3,
    wherein the read pointer and the write pointer of the virtual FIFO controller respectively point to a data reading location and a data writing location of the virtual FIFO unit, the UART unit has a data register, when the UART unit receives data up to a particular amount, the UART unit sends a request signal to request the DMA unit to transfer data from the data register to the data writing location where the write pointer points in the virtual FIFO unit, and the DMA unit further sends a write notice signal to the virtual FIFO controller so that the virtual FIFO controller correspondingly changes the value of the write pointer;
    wherein the virtual port has a peripheral device address and the processor regards the virtual FIFO DMA device as a peripheral device, when the processor reads data from the virtual FIFO unit, the processor sends a reading signal to the virtual port and the virtual port sends a DMA read request to the DMA unit, the DMA unit reads the virtual FIFO unit to get a first data according to the read pointer, the DMA unit further sends a read notice signal to the virtual FIFO controller to change the value of the read pointer accordingly, and the DMA unit transmits the first data to the virtual port, which in turn transmits the first data to the processor.

5. The device according to claim 4, wherein the electronic device is a mobile phone.

6. The device according to claim 3, wherein the read pointer and the write pointer of the virtual FIFO controller respectively point to a data reading location and a data writing location of the virtual FIFO unit, the UART unit has a data register; and when data of the processor need to be transmitted from the UART unit, the processor transmits a transmission instruction and a data-to-be-transmitted data to the virtual port, the virtual port sends a write request to the DMA unit, and the DMA unit writes the data-to-be-transmitted data to the virtual FIFO unit according to the value of the write pointer, the DMA unit sends a write notice signal to the virtual FIFO controller for the virtual FIFO controller to correspondingly change the value of the write pointer, and the DMA unit sequentially transfers data from the virtual FIFO unit to the data register of the UART unit.

7. The device according to claim 3, wherein the virtual port has a peripheral device address and the processor regards the virtual FIFO DMA device as a peripheral device, when the processor reads data from the virtual port, the virtual port sends a DMA read request to the DMA unit, which in turn gets a first data from the virtual FIFO unit according to the read pointer, the virtual FIFO controller changes the value of the read pointer accordingly, and the DMA unit transmits the first data to the virtual port, which in turn transmits the first data to the processor;
    when the processor transmits a to-be-written second data to the virtual port, the virtual port sends a DMA write request to the DMA unit, which in turn writes the to-be-written second data into the virtual FIFO unit according to the write pointer, and the virtual FIFO controller changes the value of the write pointer.

8. The device according to claim 3, wherein the virtual FIFO controller further has a flow control function, and the virtual FIFO controller disables all write instructions when the virtual FIFO unit is full, and disables all read instructions when the virtual FIFO unit is empty.

9. An electronic device, comprising:
    a memory access device;
    a receiving/transmitting unit connected to the memory access device;
    a data storage unit connected to the memory access device, wherein the memory access device transfers data between the receiving/transmitting unit and the data storage unit; and
    a processor connected to the memory access device, wherein the processor reads data from or writes data into the data storage unit through the memory access device;

wherein the memory access device comprises:
an access unit connected between the receiving/transmitting unit and the data storage unit, the access unit controlling transferring of data between the receiving/transmitting unit and the data storage unit; and
a controller connected to the access unit, the controller controlling the access unit to read data from or write data into the data storage unit;
wherein the controller has a write pointer; and
wherein when the receiving/transmitting unit receives data up to a particular amount during data writing, the receiving/transmitting unit requests the access unit to transfer data from the receiving/transmitting unit to the data storage unit where the write pointer points, and the access unit further sends a notice signal to the controller so that the controller correspondingly changes the value of the write pointer.

10. The electronic device according to claim 9, wherein the memory access device is an FIFO DMA device, the receiving/transmitting unit is a UART unit, and the data storage unit is a virtual FIFO unit.

11. The electronic device according to claim 10, wherein the FIFO DMA device further comprises:
a DMA unit;
a virtual port electrically connected with the DMA unit; and
a virtual FIFO controller electrically connected with the DMA unit, wherein the virtual FIFO controller has a read pointer and the write pointer;
wherein when the DMA unit reads data from or writes data into the virtual FIFO unit, the virtual FIFO controller correspondingly changes a value of the read pointer or a value of the write pointer;
wherein the processor is electrically connected with the virtual port, the processor reading data from or writing data into the virtual FIFO unit through the virtual port and the DMA unit.

12. An electronic device according to claim 11, wherein the UART unit has a data register, and data in the data register is transferred to the virtual FIFO unit by the DMA unit when the data register is full.

13. The electronic device according to claim 12, wherein the electronic device is a mobile phone.

14. The electronic device according to claim 11, wherein the virtual port has a peripheral device address, and the processor regards the virtual FIFO DMA device as a peripheral device, when the processor reads data from the virtual port, the virtual port sends a DMA read request to the DMA unit, which in turn reads a first data from the virtual FIFO unit according to the read pointer, the virtual FIFO controller changes the value of the read pointer accordingly, and the DMA unit transmits the first data to the virtual port, which in turn transmits the first data to the processor;
when the processor transmits a to-be-written second data to the virtual port, the virtual port sends a DMA write request to the DMA unit, which in turn writes the to-be-written second data into the virtual FIFO unit according to the write pointer, and the virtual FIFO controller changes the value of the write pointer.

15. The electronic device according to claim 11, wherein the virtual FIFO controller further has a flow control function, and the virtual FIFO controller disables all write instructions when the virtual FIFO unit is full and disables all read instructions when the virtual FIFO unit is empty.

16. A memory access method applied in an electronic device, the electronic device having a processor, a receiving/transmitting unit, a memory access device, and a data storage unit, the memory access device having an access unit and a controller, the access unit connected to the receiving/transmitting unit and the data storage unit for controlling transferring of data between the receiving/transmitting unit and the data storage unit, the controller connected to the access unit for controlling the access unit to read data from or write data into the data storage unit, and the memory access method comprising:
(a) receiving data by the receiving/transmitting unit;
(b) transferring data from the receiving/transmitting unit to the data storage unit by the access unit, wherein when the receiving/transmitting unit receives data up to a particular amount during data writing, the receiving/transmitting unit requests the access unit to transfer data from the receiving/transmitting unit to the data storage unit where a write pointer of the controller points, and the access unit further sends a notice signal to the controller so that the controller correspondingly changes the value of the write pointer; and
(c) reading data from the data storage unit through the access unit by the processor.

17. The method according to claim 16, wherein the memory access device is a virtual FIFO DMA device, the receiving/transmitting unit is a UART unit, the data storage unit is a virtual FIFO unit, the access unit is a DMA unit, the controller is a virtual FIFO controller, and the virtual FIFO DMA device further comprises a virtual port electrically connected to the DMA unit and the processor, wherein the processor reads data from or writes data into the virtual FIFO unit through the virtual port and the DMA unit.

18. The method according to claim 17, wherein the virtual FIFO controller has a read pointer and the write pointer, and when the DMA unit reads data from or writes data into the virtual FIFO unit, the virtual FIFO controller correspondingly changes a value of the read pointer or a value of the write pointer.

19. The method according to claim 18,
wherein the UART unit has a data register, and step (b) comprises:
(b1) sending a request signal by the UART unit to notify the DMA unit to transfer data stored in the data register to a location of the virtual FIFO unit pointed to by the write pointer when the UART unit has collected a pre-determined amount of data; and
(b2) sending a write notice signal to the virtual FIFO controller by the DMA unit so that the virtual FIFO controller correspondingly changes the value of the write pointer.

20. The method according to claim 18,
wherein the virtual port has a peripheral device address, so that the processor regards the virtual FIFO DMA device as a peripheral device, the step (c) comprising:
(c1) sending a read signal to the virtual port by the processor, so that the virtual port sends a DMA read request to the DMA unit;
(c2) reading the virtual FIFO unit for a first data by the DMA unit according to the read pointer;
(c3) sending a read notice signal to the virtual FIFO controller by the DMA unit, so that the virtual FIFO controller changes the value of the read pointer; and
(c4) transferring the first data to the virtual port by the DMA unit, wherein the virtual port transfers the first data to the processor in turn.

21. The method according to claim 16, wherein the electronic device is a mobile phone.

22. A memory access method applied in an electronic device, the electronic device having a processor, a receiving/ transmitting unit, a memory access device, and a data storage unit, the memory access device having an access unit and a controller, the access unit connected between the receiving/transmitting unit and the data storage unit for transferring data between the receiving/transmitting unit and the data storage unit, the controller connected to the access unit for controlling the access unit for reading data from or writing data into the data storage unit, and the memory access method comprising:

(a) writing data into the data storage unit by the processor through the access unit, and meanwhile, the access unit sends a notice signal to the controller to update a write pointer of the controller;

(b) transferring data from the data storage unit to the receiving/transmitting unit by the access unit; and (c) transmitting data by the receiving/transmitting unit.

23. The method according to claim 22, wherein the memory access device is a virtual FIFO DMA device, the receiving/transmitting unit is a UART unit, the data storage unit is a virtual FIFO unit, the access unit is a DMA unit, the controller is a virtual FIFO controller, the virtual FIFO DMA device further comprises a virtual port electrically connected to the DMA unit and the processor, and the processor reads data from or writes data into the virtual FIFO unit through the virtual port and the DMA unit.

24. The method according to claim 23, wherein the virtual FIFO controller has a read pointer and the write pointer, and when the DMA unit reads data from or writes data into the virtual FIFO unit, the virtual FIFO controller correspondingly changes a value of the read pointer or a value of the write pointer.

25. The method according to claim 24, wherein the UART unit has a data register, and the virtual port has a peripheral device address, so that the processor regards the virtual FIFO DMA device as a peripheral device, the step (a) comprising:

(a1) transmitting a transmission instruction and a to-be-transmitted data to the virtual port by the processor;

(a2) sending a write request to the DMA unit, so that the DMA unit writes the to-be-transmitted data into the virtual FIFO unit according to the value of the write pointer; and (a3) sending a write notice signal to the virtual FIFO controller by the DMA unit, so that the virtual FIFO controller correspondingly changes the value of the write pointer;

wherein, in step (b), the DMA unit sequentially transfers data stored in the virtual FIFO unit to the data register of the UART unit.

26. The method according to claim 22, wherein the electronic device is a mobile phone.

* * * * *